United States Patent [19]
McDonough et al.

[11] 3,718,815
[45] Feb. 27, 1973

[54] PHOTOGRAPHIC FLASHLAMP UNIT WITH FLASHED LAMP INDICATOR AND METHOD OF MAKING SAME

[75] Inventors: Thomas B. McDonough, Allenwood; John W. Shaffer, Williamsport, both of Pa.

[73] Assignee: GTE Sylvania Incorporated

[22] Filed: March 9, 1971

[21] Appl. No.: 122,454

[52] U.S. Cl..................240/1.3, 116/114 V, 431/13, 431/93
[51] Int. Cl..........................F21k 5/02, G03b 15/02
[58] Field of Search ......240/1.3; 116/114 V; 431/93, 431/13

[56] References Cited

UNITED STATES PATENTS

| | | | |
|---|---|---|---|
| 3,609,331 | 9/1971 | Fink et al. | 240/1.3 |
| 3,586,470 | 6/1971 | Brown et al. | 431/13 |
| 3,586,471 | 6/1971 | McDonough et al. | 431/13 |

FOREIGN PATENTS OR APPLICATIONS

| | | | |
|---|---|---|---|
| 255,897 | 11/1966 | Austria | 240/1.3 |

*Primary Examiner*—Louis R. Prince
*Assistant Examiner*—Joseph W. Roskos
*Attorney*—Norman J. O'Malley, Edward J. Coleman and Joseph C. Ryan

[57] ABSTRACT

A flashcube having a flashed lamp indicator comprising a spot of dried paste composed of blue powder, a meltable red dye, a meltable organic compound which in the molten state functions as a solvent for the dye, and a binding resin. The paste is prepared as an aqueous dispersion and, in the process of making the flashcube, may be applied on the inside surface of each of the flashcube windows.

11 Claims, 2 Drawing Figures

PATENTED FEB 27 1973

3,718,815

JOHN W. SHAFFER
THOMAS B. McDONOUGH
INVENTORS

BY Edward J Coleman
ATTORNEY

PHOTOGRAPHIC FLASHLAMP UNIT WITH FLASHED LAMP INDICATOR AND METHOD OF MAKING SAME

BACKGROUND OF THE INVENTION

This invention relates to the manufacture of photoflash lamps and more particularly to photographic flashlamp units having a plurality of lamps arranged in a unitary structure adapted to be rotatably mounted on a camera and having readily visible means for indicating a flashed lamp.

A unit of the type with which this invention is concerned is known generally in the trade as a flashcube and a specific embodiment of one is shown in U.S. Pat. No. 3,327,105, for example. It comprises a plurality of flashlamps, each with its own reflector, mounted on a base and enclosed within a transparent container, each of the side walls of which defines a window for the lamp-reflector assembly located therein.

Prior to the introduction of the flashcube, photoflash lamps were handled individually, i.e., each lamp was inserted in a suitable socket, receptacle or the like provided therefor either in the camera itself or in a flashgun attachment associated therewith. When the lamp was flashed the operator removed the flashed lamp and replaced it with a fresh one. In these circumstances there was little likelihood of confusion or doubt as to whether or not a lamp in firing position had in fact already been flashed. The lamp was relatively large in size and exposed. Even the most cursory examination would readily and quickly indicate to the operator the condition of the lamp. However, such is not the case with respect to the flashlamps in flashcubes.

The flashlamps used in flashcubes are highly miniaturized with an internal volume of less than one cubic centimeter. The exterior surface of the lamp envelope is covered with one or more, usually several, layers of reinforcing lacquer film of a resin such as cellulose acetate. Since these lamps are intended for use with daylight-type color film, a blue dye is usually incorporated in the protective lacquer coating. The function of such a blue coating is to modify the spectral energy output from the flashlamp combustion so as to make it similar to that of daylight.

Not only is the lamp presently used in commercial flashcubes considerably smaller than the commercial flashlamp of only s few years ago, thus making it more difficult to verify its condition, but the fact that each lamp is recessed back into its reflector also adds to the problem. The fact that the environmental light levels are usually relatively low when flash photography is used also adds to the difficulty of determining whether or not any given lamp of the four in a flashcube has already been flashed.

In addition to the foregoing, there is always the problem of verifying the unused lamps in a flashcube before remounting the flashcube on a camera after an intervening period of daylight picture taking. When the flashcube is remounted for flash pictures, it must be oriented so that an unused lamp is in firing position and other unused lamps, if any, are in the proper relation to it.

A particularly convenient method for aiding the camera operator in the identification of used lamps involves the use of a color indicator spot on the flashlamp unit which changes color in response to the heat of a flashed lamp. Ideally, the color change should be reliable, unambiguous, permanent and clean cut. Prior methods of providing color indicators include the use of a decomposable blue pigment, such as Prussian blue, in conjunction with a red dye to give a spot that theoretically turns from blue to red. It has been found, however, that such spots are actually a rose-violet color before being subjected to heat, and are essentially black with a red circumference after being heated. The black coloration results from thermal breakdown of the Prussian blue which destroys the blue color present. When used in a flashlamp unit, therefore, the appearance of this spot after flashing is rather poor and somewhat ambiguous due to the blackness of the center and the smeared red halo.

Another former method of providing a flashed lamp indication involves the application of a pale green heat-sensitive dye to the inner face of a flashcube cover. The heat of the flashing lamp decomposes the dye and thereby turns the spot black. Such spots require rather intense heat, however, and sometimes fail to perform in the desired manner upon flashing of the adjacent lamp.

A relatively improved method of providing a flashed lamp indication, by use of a sublimable dye spot, is described in U.S. Pat. Application Ser. No. 740,242, filed June 26, 1968 and assigned to the assignee of the present invention. This spot functions by the sublimation transfer of a colored dye from a spot on the exterior surface of the lamp to the cube face upon flashing of the lamp. Although reliably providing an unambiguous color change, the resulting smeared and uncontrollable dye condensate on the cube face presents a somewhat unaesthetic appearance.

SUMMARY OF THE INVENTION

Accordingly, it is an object of the present invention to provide a photographic flashlamp unit having an improved visual indicator to show which of the lamps have been flashed.

Another object is to provide a flashed lamp indicator having improved appearance both before and after functioning and which reliably changes color to show, under poor light conditions, which lamps have been used.

A further object is to provide an improved method of making flashcubes having a flashed lamp indicator spot.

We have found that these objects can be achieved by providing, for each lamp in the flashcube, a spot of dried paste comprising a mixture of powdered glass and a water insoluble dye that melts at a relatively low temperature without decomposition. In making the lamp, the paste is prepared as an aqueous dispersion of the glass powder and dye in combination with a water soluble binding resin. Preferably, the paste is applied to the inside surface of each of the "windows" of the flashcube. The initial color of the indicator spot is the pure vivid color of the glass powder used, and after flashing of the lamp, the color is dramatically changed to that of the dye used. Quite unexpectedly, the dye, upon being melted by the flashed lamp, fills the interstices of the powdered glass to provide a permanent and unambiguous color transition.

According to a preferred embodiment of the invention, further improvement is provided by adding to the paste a powdered, low melting organic compound which is insoluble in water and in the molten state functions as a solvent for the dye. In this instance, the organic additive controls the temperature sensitivity of the indicator spot and dissolves the dye upon flashing. With the additive, a much lower ratio of dye to ground glass is required, thereby resulting in a brighter color both before and after functioning. More importantly, the organic additive provides a more sensitive and reliable indicator, with significantly improved spot boundary definition, thereby making feasible application of the paste in the form of a printed letter or word.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
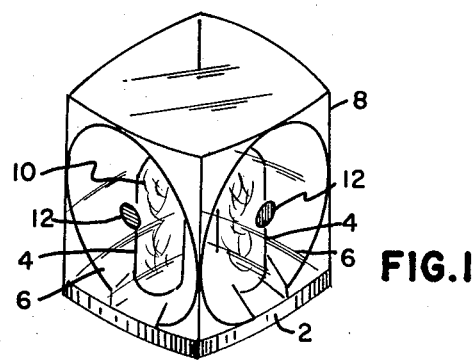
FIG. 1 is a perspective view of a flashcube having a flashed lamp indicator in the form of a round spot according to the invention.

Referring to FIG. 1, the specific embodiment of a flashcube shown therein comprises a substantially square base or platform 2 on which four flashlamps 4 are mounted, one along each side thereof. Each lamp 4 has its own reflector 6 and the four reflectors are disposed behind the lamps on the platform. The plurality of lamp-reflector assemblies are enclosed within a transparent container 8 which is secured to the base 2 along the periphery thereof. Hence, each lamp faces a respective transparent side of container 8 whereby that side provides a window for the lamp.

Each flashlamp 4 comprises an hermetically sealed light transmitting envelope within which a combustible, such as shredded zirconium foil 10, a combustion supporting gas such as oxygen, and an ignition system are disposed. The ignition system, not shown, may include a filament with a coating of ignition paste attached to a pair of lead-in wires extending from the lamp and wrapped around a contact ring integral with and extending downwardly from the base 2. Alternatively, a percussive-type ignition system may be employed in which a primer is sealed in one end of the lamp, the primer comprising a metal tube with a charge of fulminating material on a wire anvil supported therein. In such case, a base-mounted firing spring is associated with each lamp for initiating lamp operation by impact onto the primer tube.

The exterior surface of the light-transmitting envelope of each flashlamp is provided with a reinforcing lacquer film of a resin such as cellulose acetate. Since these lamps are intended primarily for use with daylight-type color film, a blue dye is usually incorporated into the protective lacquer coating.

In the flashcube embodiment of FIG. 1, the flashed lamp indicating means comprises a round spot 12 of dried paste disposed on the inside face of each of the windows of container 8. According to one aspect of the invention, the dried paste of indicator spot 12 is composed of a powdered glass, a water insoluble dye that melts at a low temperature without decomposition, and a water soluble binding resin. Prior to application, the paste is prepared as an aqueous dispersion of the glass powder, dye and binding resin.

Such compositions using colorless glass powder afford a spot that is nearly white before the adjacent lamp is flashed and is a brilliant red, or other color, after flashing of the lamp. The initial spot may be any desired color, such as blue for example, by using a blue glass powder. Because the low melting dye is insoluble in water and is present in a small amount as discrete particles, the initial color of the spot is a pure vivid color of the glass powder used. The color after flashing of the lamp is again a pure clean color dependent upon the dye used. Quite unexpectedly, the dye tends to flow toward the interface between the inside surface of container 8 and the spot 12 upon melting, thereby completely hiding the glass powder that provided the initial color.

A suitable paste composition that affords a pure blue initial spot, which turns a brilliant red upon flashing of the adjacent lamp, is the following: 16 parts by weight of blue powdered glass, 1 part by weight Amaplast Red GG, and 24 parts by weight 4 percent hydroxypropyl cellulose in water.

In accordance with a preferred embodiment of the invention, however, it has been found that the addition of a powdered low melting organic compound, which in the molten state functions as a solvent for the dye, greatly improves both the appearance and reliability of color change in such spots. For example, when powdered diphenyl phthalate (which melts at 73°C) was stirred into the spotting paste, the dried spots were much more sensitive and reliable. It was found that a much lower ratio of dye to ground glass is required, in the presence of diphenyl phthalate, thereby resulting in greatly increased brightness in both the initial blue color and the red color of the spot after functioning. In the presence of diphenyl phthalate, one part of red dye is sufficient for 75 parts of blue glass powder. For best results the ingredients should be selected such that the dye has a melting point equal to or greater than the melting point of the organic compound. A specific formulation that uses the principle of this invention has the following dried paste composition: 1 part dye (e.g., Color Index solvent red 24), 75 parts blue glass powder, 25 parts diphenyl phthalate, and 12.5 parts hydroxypropyl cellulose.

The method of making a flashcube having a flashed lamp indicator spot according to the invention may include the following steps. First, a container 8 is provided which has a box-like shape with an open bottom and four transparent sides. Next, the color indicator paste is prepared by stirring the above noted ingredients, in finely powdered form, with sufficient water to give the desired consistency. More specifically, the paste may comprise an aqueous dispersion containing 75 parts blue glass powder, 1 part of the water insoluble, meltable red dye, 25 parts diphenyl phthalate, and sufficient hydropropyl cellulose to provide the desired dried paste proportion of the binding resin, denoted as 12.5 parts in the specific formulation mentioned above. This paste is then applied as a round spot 12 on the inside face of each of the transparent sides of container 8. After drying, the container 8 is closed with the base 2 in a manner whereby the flashlamps 4 mounted on base 2 are disposed in the container with each lamp facing a respective transparent side thereof, as shown in FIG. 1. More specifically, the reflector unit 6 is inserted in container 8, e.g., as described in U.S. Pat. No. 3,358,131, and the reflector unit and container assembly is threaded over the lamps 4 disposed upright on base 2 until each lamp is disposed in its reflector, as shown. Container 8 is then secured to the base 2 at the outer edges by suitable means, as for example, by adhesive, heat sealing, or sonic sealing.

Figure 2:
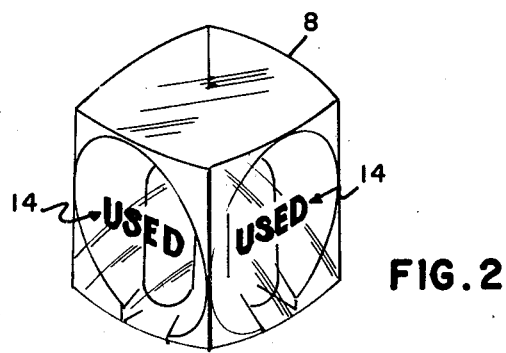
FIG. 2 is a perspective view of a flashcube having a flashed lamp indicator in the form of a printed word according to the invention.

In the finished flashcube, an unused flashlamp is indicated by a bright blue spot on the container 8 window for that lamp; this is illustrated on the left-hand side of FIG. 1, wherein the color blue is represented by the horizontal crosshatching of spot 12. When a flashlamp is used, the heat emanated by the flashing lamp melts the organic compound (diphenyl phthalate) in the indicator spot. The molten organic substance dissolves or melts the red dye component, whereupon the dye flows by capillary attraction to fill the void interstices between the powered glass particles and thereby provides a permanent color transition. The result is a bright red spot on the container window of the used lamp; this is illustrated on the right hand side of FIG. 1, wherein the color red is represented by the vertical crosshatching of spot 12. The spots containing diphenyl phthalate and much less dye do not cause smoking or streaking of the cube face and thereby have a much neater appearance after flashing. This improvement in definition of the spot boundary makes it feasible to apply the indicator paste in the form of a printed letter or word instead of merely a round spot. For example, the word "used" could be made to appear in red across the face of the flashcube after the lamp had been flashed. More specifically, a clear or white glass powder might be employed, whereby the word "used" is substantially invisible or appears in white on the window of an unused lamp, as illustrated by marking 14 on the left-hand side of FIG. 2. Then, upon flashing a lamp, the dissolved or melted dye transforms the word "used" to appear in red on the associated container window, as illustrated by the solid-lettered marking 14 on the right-hand side of FIG. 2.

There are numerous alternatives to the above stated indicator paste composition. Powdered refractory materials other than glass may be employed, such as the use of powders of ceramic or other heat-stable materials of whatever color is desired. Any desired color of dye may be employed provided the dye is insoluble in water, has a low melting point equal to or greater than the melting point of the organic compound, and melts without decomposition. Numerous alternative organic compounds may be used, the limiting requirement for such materials being insolubility in water and the capability of acting as a good solvent for the dye when in the molten state. Some specific examples of suitable organic substances with their respective melting points are: biphenyl (m.p. 70°C), octadecanol (m.p. 58°C), tripalmitin (m.p. 65°C), tribenzoin (m.p. 76°C), and others. The temperature at which spot color change occurs can be regulated quite closely by proper choice of the meltable organic additive. For practical reasons, however, the melting point of the organic compounds should lie in a range from 50°C to 100°C.

Water-soluble binders other than hydroxypropyl cellulose may be used provided they afford satisfactory adhesion to the surface of the flashcube container.

The relative proportions of the paste ingredients are not critical and may be varied over a wide range. The ratio of dye to powdered refractory material may be varied from about 1:100 to 1:5. The ratio of meltable organic additive to powdered refractory material may be varied from 1:100 to 5:1. The binding resin may be present in the dried paste to the extent of from about 1 to 25%.

The indicator spot may take the form of a dot, a letter, a word or any other marking and may be located on any surface of the flashcube (e.g. different parts of the window, the top of the container, the reflector, etc.) provided the dried paste is in sufficient heat-receiving relationship with its associated lamp such that the organic compound is melted in response to lamp flashing.

What we claim is:

1. A photographic flashlamp unit comprising: a closed container having a plurality of transparent sides; a plurality of flashlamps disposed in said container, each lamp facing a respective transparent side of said container whereby a window is provided for each of said lamps; and a flashed lamp indicator comprising a spot of dried paste disposed on a surface of said unit in heat-receiving relationship with each of said flashlamps, said dried paste comprising a powdered refractory material, a water insoluble dye which is meltable without decomposition, a water soluble binding resin, and a meltable water insoluble organic compound, which in the molten state functions as a solvent for said dye, said organic compound being melted from the heat of lamp flashing whereupon said dye is dissolved or melted to fill the interstices of said powdered refractory material and thereby provide a permanent color transition for identifying said lamp as having been flashed.

2. A flashlamp unit according to claim 1 wherein said spot of dried paste is disposed on the inside face of said window.

3. A flashlamp unit according to claim 1 wherein the melting point of said organic compound is not less than 50°C and not more thant 100°C, and the melting point of said dye is equal to or greater than the melting point of said organic compound.

4. A flashlamp unit according to claim 3 wherein said refractory material is powdered glass, and said organic compound is at least one member of the group consisting of diphenyl phthalate, biphenyl, octadecanol, tripalmitin and tribenzoin.

5. A flashlamp unit according to claim 4 wherein said binding resin is hydroxypropyl cellulose.

6. A flashlamp unit according to claim 1 wherein the ratio of said dye to said powdered refractory material in said dried paste is not less than 1:100 and not more than 1:5, the ratio of said organic compound to said powdered refractory material in said dried paste is not less than 1:100 and not more than 5:1, and the proportion of said binding resin in said dried paste is not less than 1 percent and not more than 25 percent.

7. A flashlamp unit according to claim 1 wherein said refractory material is blue glass powder, and said dye is red.

8. The method of making a photographic flashlamp unit having a flashed lamp indicator spot, said method comprising:

provIding a container having a plurality of transparent sides;

preparing a paste comprising an aqueous dispersion containing a powdered refractory material, a powdered water insoluble dye which is meltable without decomposition, a water soluble binding resin, and a powdered, meltable, water insoluble organic compound which in the molten state functions as a solvent for said dye;

applying a spot of said paste on the inside face of at least one of the transparent sides of said container;

drying said spotted container;

and closing said container with a base having a plurality of flashlamps mounted therein in a manner whereby said flashlamps are disposed in said container with each lamp facing a respective transparent side thereof.

9. The method of claim 8 in which the refractory material in said paste is powdered glass, and the organic compound in said paste is at least one member of the group consisting of diphenyl phthalate, byphenyl, octadecanol, tripalmitin, and tribenzoin.

10. The method of claim 9 in which the binding resin in said paste is hydroxypropyl cellulose.

11. The method of claim 8 in which the ratio of said dye to said powdered refractory material in said paste is not less than 1:100 and not more than 1:5, the ratio of said organic compound to said powdered refractory material in said paste is not less than 1:100 and not more than 5:1, and the proportion of said binding resin in said paste is sufficient to comprise not less than 1 percent nor more than 25 percent of said paste when dried.

* * * * *